US008037284B2

(12) United States Patent
Schenfeld et al.

(10) Patent No.: US 8,037,284 B2
(45) Date of Patent: *Oct. 11, 2011

(54) STREAM PROCESSING IN OPTICALLY LINKED SUPER NODE CLUSTERS OF PROCESSORS BY MAPPING STREAM GRAPH TO NODES AND LINKS

(75) Inventors: Eugen Schenfeld, Monmouth Junction, NJ (US); Smith T. Basil, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,492

(22) Filed: Nov. 9, 2010

(65) Prior Publication Data

US 2011/0055519 A1   Mar. 3, 2011

Related U.S. Application Data

(63) Continuation of application No. 12/193,125, filed on Aug. 18, 2008, now Pat. No. 7,856,544.

(51) Int. Cl.
*G06F 15/16* (2006.01)
(52) U.S. Cl. .......................................... 712/28; 709/231
(58) Field of Classification Search ........................ None
See application file for complete search history.

(56) References Cited

U.S. PATENT DOCUMENTS

| 6,671,254 | B1 | 12/2003 | Nakahira |
| 6,748,174 | B2 | 6/2004 | Milton et al. |
| 6,792,174 | B1 | 9/2004 | Ramaswami |
| 6,809,734 | B2 | 10/2004 | Suzuoki et al. |
| 6,850,989 | B1 | 2/2005 | Lavian et al. |
| 7,000,022 | B2 * | 2/2006 | Lisitsa et al. ................. 709/231 |
| 7,263,096 | B2 | 8/2007 | Yang et al. |
| 7,441,224 | B2 * | 10/2008 | Bellas et al. .................. 716/107 |
| 2002/0131103 | A1 | 9/2002 | Bambos |

(Continued)

FOREIGN PATENT DOCUMENTS

EP    0568402 B1    1/1999

(Continued)

OTHER PUBLICATIONS

L. Schares et al., "A Reconfigurable Interconnect Fabric With Optical Circuit Switch and Software Optimizer for Stream Computing Systems," Optical Society of America, 2009. 3 pgs.

(Continued)

*Primary Examiner* — Kenneth Kim
(74) *Attorney, Agent, or Firm* — Cantor Colburn LLP; Brian Verminski

(57) ABSTRACT

A stream processing computer architecture includes creating a stream computer processing (SCP) system by forming a super node cluster of processors representing physical computation nodes ("nodes"), communicatively coupling the processors via a local interconnection means ("interconnect"), and communicatively coupling the cluster to an optical circuit switch (OCS), via optical external links ("links"). The OCS is communicatively coupled to another cluster of processors via the links. The method also includes generating a stream computation graph including kernels and data streams, and mapping the graph to the SCP system, which includes assigning the kernels to the clusters and respective nodes, assigning data stream traffic between the kernels to the interconnection when the data stream is between nodes in the same cluster, and assigning traffic between the kernels to the links when the data stream is between nodes in different clusters.

18 Claims, 6 Drawing Sheets

U.S. PATENT DOCUMENTS

| | | |
|---|---|---|
| 2004/0052527 A1 | 3/2004 | Kirby |
| 2004/0131308 A1 | 7/2004 | Mao et al. |
| 2005/0105905 A1 | 5/2005 | Ovadia et al. |
| 2007/0043742 A1 | 2/2007 | Arguello et al. |
| 2007/0198971 A1 | 8/2007 | Dasu et al. |
| 2007/0204020 A1 | 8/2007 | Anderson et al. |
| 2007/0211280 A1 | 9/2007 | Bansal et al. |
| 2007/0214458 A1 | 9/2007 | Bansal et al. |
| 2008/0025238 A1 | 1/2008 | McCown et al. |
| 2008/0025288 A1 | 1/2008 | Benner et al. |
| 2008/0250390 A1 | 10/2008 | Feblowitz et al. |
| 2009/0119238 A1 | 5/2009 | Amini et al. |
| 2009/0238178 A1 | 9/2009 | Giles et al. |
| 2009/0241123 A1 | 9/2009 | Bansal et al. |
| 2009/0300623 A1 | 12/2009 | Bansal et al. |
| 2010/0242042 A1 | 9/2010 | Bansal et al. |

FOREIGN PATENT DOCUMENTS

| | | |
|---|---|---|
| JP | 2006113566 A | 4/2006 |
| WO | WO0186998 A1 | 11/2001 |

OTHER PUBLICATIONS

Lisa Amini, et al., "Adaptive Control of Extreme-scale Stream Processing Systems,"Proceedings of the 26th IEEE International on Distributed Computing Systems, Copyright 2006, 7 pages.

Kevin J. Barker, et al., "On the Feasibility of Optical Circuit Switching for High Performance Computing Systems SC/05" Nov. 12-18, 2005, Seattle, Washington, 2005 ACM, 22 pages.

Charu C. Aggarwal et al., "Challenges and Experience in Prototyping a Multi-Modal Stream Analytic and Monitoring Application on System S", Sep. 23-28, 2007, Vienna, Austria.

William J. Daly, et al., "Merrimac: Supercomputing with Streams," SC'03, Nov. 15-21, 2003, Phoenix, Arizona, Copyright 2003, ACM, 8 pages.

International Search Report; International Application No. PCT/EP2009/060483; International Filing Date: Aug. 13, 2009; Date of Mailing: Oct. 19, 2009; 4 pages.

Bugra Gedik et al., "SPADE: The System S Declarative Stream Processing Engine," SIGMOD, Jun. 9-12, 2008, pp. 1123-1134, Vancouver, BC, Canada.

Written Opinion of the International Searching Authority; International Application No. PCT/EP2009/060483; International Filing Date: Aug. 13, 2009; Date of Mailing: Oct. 19, 2009; 7 pages.

Roden, C., et al. "Modeling a circuit switched fiber optic interconnection for MIMD multiprocessor system", ICEC '95, International Conference on Electronics, Circuits & Systems, Amman, Jordan, Dec. 17-21, 1995, p. 537-542.

Hong, Jiang, et al.; "Efficient algroithms for non-blocking wormhole routing and circuit switching on linear array mulitprocessors"; Parallel and Distributed Computing Systems: Proceedings of the ISCA International Conference, Oct. 6-8, 1994, International Society for Computers and their Applications, Jan. 1994, p. 614-619.

Yasrebi, M., et al.; "A comparison of circuit switching and packet switching for data transfer in two simple image processing algorithms"; Proceedings of the 1983 International Conference on Parallel Processing, Aug. 23-26, 1983, IEEE, US, Jan. 1983, p. 25-28.

Shao, Shuyi, et al.; "Symbolic expression analysis for compiled communication"; 2008 IEEE International Parallel & Distributed Processing Symposium, Apr. 18 2008, p. 2255-2262.

European Office Action dated Mar. 22, 2011 for Application No. 09 781 791.0-2211.

* cited by examiner

STREAM PROCESSING IN OPTICALLY LINKED SUPER NODE CLUSTERS OF PROCESSORS BY MAPPING STREAM GRAPH TO NODES AND LINKS

CROSS REFERENCE TO RELATED APPLICATIONS

This application is a continuation of U.S. patent application Ser. No. 12/193,125 filed Aug. 18, 2008, the contents of which are incorporated by reference herein in their entirety.

BACKGROUND

The present invention relates to data processing systems, and more specifically, to a method and system for implementing a stream processing computer architecture.

The impact of communication on the performance of computer systems continues to grow both at the macro-level (e.g., blade servers and clusters of computers) and at the micro-level (e.g., within a single processor chip having many cores). The traditional approach to computing, which relies on diminishing the access time to main memory through a hierarchy of cache memories, is reaching a point of diminishing returns. This is true, in part, because of the increasing latency of I/O data transmission with respect to the speed of the processing cores, as well as the increasing fraction of the (limited) on-chip power dissipation budget that is demanded by cache memories and global communication wires. Meanwhile, the tight on-chip power dissipation constraints have caused many major semiconductor companies to move to multi-core or chip multiprocessor (CMP) architectures. The emergence of CMPs has, in turn, placed increased challenges on the communications infrastructure in two major areas. In particular, the growing number of processing cores in CMPs exacerbates the bandwidth requirements for both intra-chip and inter-chip communication. Additionally, CMP architectures vastly increase the programming complexity and ultimate productivity as compared with traditional single-core processor chips.

Stream processing has recently emerged as an alternative computation model approach for systems that are based on CMP architectures and software managed cache memory organization. Many classes of important applications, e.g., digital signal processing and multimedia applications, present fairly regular access to long sequences of regular data structures that can be processed in parallel as opposed to the more randomized access to complex data records that is typical in databases. For these applications, the combination of stream processing with specialty processors such as the nVidia® and AMD/ATI graphic processing units (GPU) or IBM's® Cell Broadband Engine has the potential to offer higher performance and lower power dissipation than the traditional computing paradigm applied to general-purpose CMP architectures.

A sample stream computation graph is shown in FIG. 1. The graph 100 is made of computation nodes, called kernels (102A, 102B, and 102C), which are connected by edges 104A/104B that represent streams of data going from one kernel to another. A kernel refers to software code elements that perform the computation on the streams of data. In graph 100 of FIG. 1, these data streams are unidirectional; that is, the data moves (streams) from the left hand side to the right hand side of the Figure, as shown by the arrow. Kernels may be one of three types: source 102A (representing the origin of a stream of data generated as input to a computation graph); sink 102B (representing the end results in the form of a stream or streams); and regular kernels 102C. A kernel (102A-102C) can have one or more input streams 104A and generate, as a result of its specific computation, one or more output streams 104B.

Typically a stream computation graph (e.g., graph 100) represents a solution to a computer processing problem (e.g., detecting some events or finding a pattern and complex relationships between the input data stream—financial trading of stocks, sensory data correlations and more). The graph persists for as long as the data streams are being processed by the computation kernels, and typically this is a very long time (hours or more or indefinitely). Thus, the topology of this graph is considered to be fixed.

One challenge in dealing with such a stream computational graph is determining how to group the computation nodes (e.g., kernels 102A-102C) into groups such that these can be assigned to physical computation nodes of a computer processing system. There are many possible ways to perform such grouping (also known as scheduling, embedding, or in graph theory as a graph theory transformation known as a graph contraction). As shown in FIG. 1, shaded groups (110A-110C) represent grouping of kernels such that the kernels assigned to one group (such as group 110B as an example) will be located within one physical computation node or a cluster of nodes tightly coupled with or by using a fast local communication network. Then, the total aggregated streams passing from one such group of kernels to another may be viewed as one connection among the groups. In graph theory terms, this can be viewed as a super node within which the regular computation nodes (kernels) have been collapsed into. This type of grouping may be done for all the computation nodes in a stream computation graph. The streams, represented by edges between the kernels of the stream computation graph, can similarly be collapsed into a super edge representing the sum of all streams of data passing between the super nodes.

As an example, as shown in FIG. 1, super nodes 110C and 110B share three streams passing (from left to right) between the super nodes 110B and 110C. They can now be viewed as one stream that connects between super nodes 110B and 110C. In practice, the original streams of data, are aggregated by the physical communication fabric of the stream computing system, such that the ingress point at super node 110B will multiplex the three streams from a group of kernels (e.g., those within super node 110B) into one stream and, at the other end, group of kernels (those within super node 110C) will demultiplex these three streams back and locally connect them to the proper kernels as mapped in one physical computation node or cluster of such nodes.

There has been a growing interest in extending this stream processing paradigm to certain large scale applications in different fields such as finance, data mining, and computational biology. This extension requires going beyond running a stream application on a single GPU-like processor and, instead, involves building large, scalable Stream Processing Systems (SPSs) where many of these processors are interconnected by high-speed interconnection networks. However, building large, scalable stream processing systems suffer from various drawbacks, such as increased transmission bandwidth challenges, as well as increased access times to large data sets in memory from processing nodes.

It would be desirable, therefore, to provide an enhanced stream processing architecture that overcomes the aforementioned drawbacks.

SUMMARY

According to one embodiment of the present invention, a method for implementing a stream processing computer architecture includes creating a Stream Computer Processing (SCP) system. The SCP system is created by forming a super node cluster of processors which represent physical computation nodes within the super node cluster, communicatively coupling each of the processors in the super node cluster via a local interconnection means, and communicatively coupling the super node cluster to an Optical Circuit Switch (OCS), via multiple optical external links. The OCS is communicatively coupled to other super node clusters including processors that represent other physical computation nodes, via other multiple external links from the other super node cluster to the optical circuit switch. The method also includes generating a stream computation graph including kernels and data streams. The method further includes mapping the stream computation graph to the SCP system, which includes assigning the kernels of computation to each super node cluster and to respective physical computation nodes of each of the super node clusters, assigning data stream traffic between the kernels to the local interconnection means when the data stream is between physical computation nodes in the same super node cluster, and assigning data stream traffic between the kernels to the optical external links when the data stream is between physical computation nodes in different super node clusters. The method also includes configuring the OCSs to provide connectivity between mapped clusters corresponding to the assignments.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
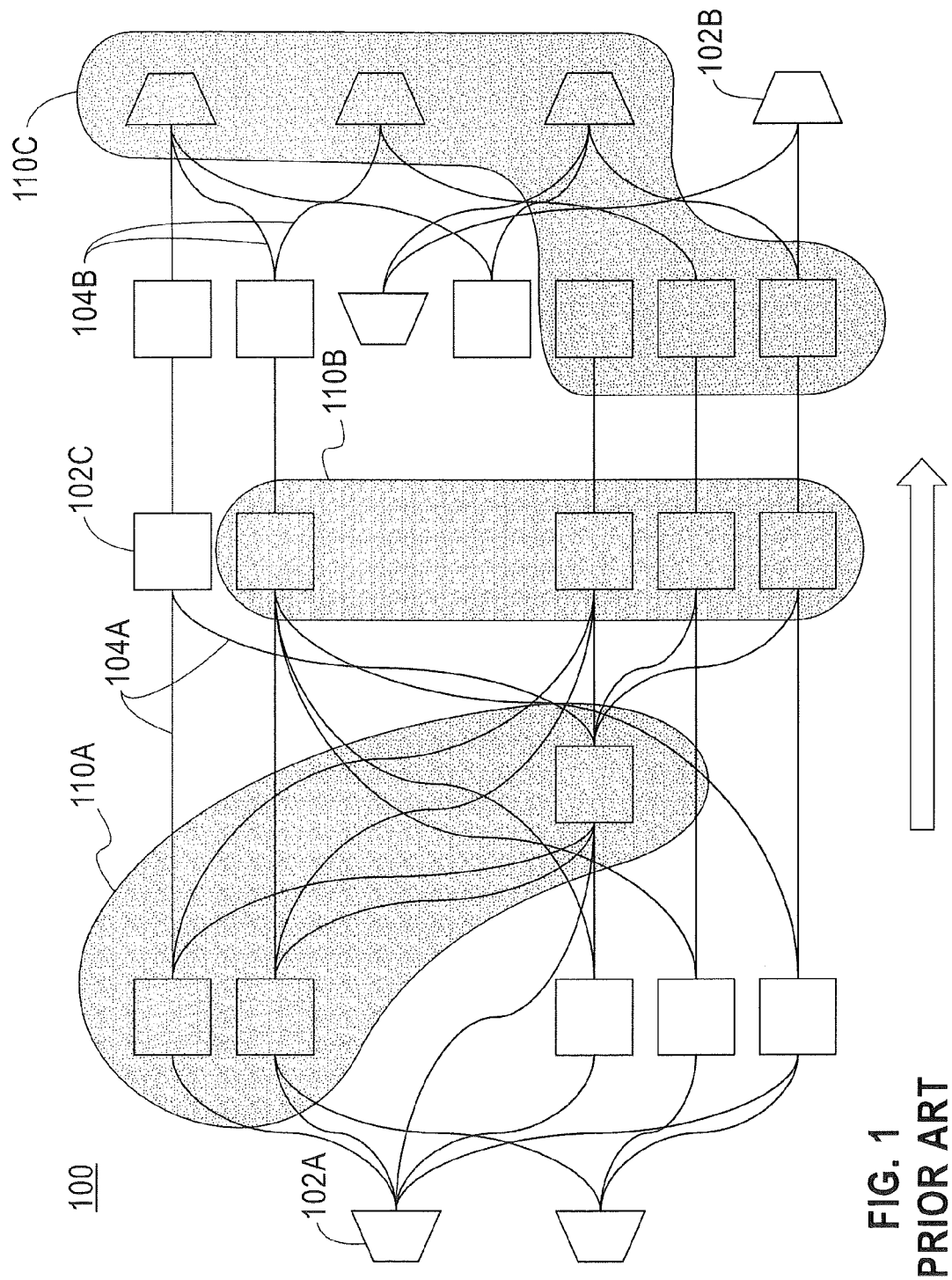
FIG. 1 is a conventional stream computation graph with node groupings.

An interconnect stream processing architecture for a stream computer system, and a process for implementing the interconnect architecture, is disclosed in accordance with an exemplary embodiment of the invention. The interconnect architecture is made of two network types, which complement each other's functionality and address connectivity among tightly coupled groups of processing nodes. Such a group, or cluster, may be locally interconnected using a variety of protocols, as well as both static and dynamic network topologies (e.g., 2D/3D mesh, hierarchical fully connected, switch based fabrics). Network and switch functionality can be incorporated within processor chips, such that clusters can be made by directly interconnecting processor chips to each other, without external switches. An example of such a technology and protocol is the HyperTransport 3 (HT3). Packaging limitations, signaling speeds and allowable distances of interconnection limit the all-electronic fabric size, hence, only a limited number of processors may directly be connected within a cluster. Achieving very high level of performance (e.g. exascale) could require up to 100,000 future multi-core processor chips interconnected within one system. While a cluster may be limited to 100 or fewer processor chips packaged within one rack, about 1000 or more of such clusters may need to be interconnected. In an exemplary embodiment, inter-cluster connections, having high bandwidth and reaching over longer distances will use optical signaling and the stream processing architecture uses Micro Electro Mechanical Systems (MEMS)-based OCS to connect among these clusters.

While the node-to-switch connectivity in many large installations is optical in order to provide the bandwidth and distance required, large-radix electrical switch fabrics are being used (e.g., for InfiniBand or 10G Ethernet protocol and switches). These require, at least, two optical transmitters (Tx) and two receivers (Rx) for a single path, as communication is converted from electrical (from the processor cluster) to optical then to electrical (for the switch) then to optical (to go out of the switch) and finally back to electrical (at the destination cluster), while the optical switch of the exemplary embodiments described herein requires only one Tx and one Rx, as this switch can directly deflect the optical signal through mirrors. Large radix, electrical switches necessarily must be made up of smaller radix building blocks, which mean that they tend to be large and power-hungry. Optical circuit switches can have a much larger single switch radix, and they promise considerably smaller size and lower power-consumption.

In an exemplary embodiment, a group of tightly coupled processors forming a cluster is interconnected using the OCS network and optical transceivers to other such clusters within the SPS. This OCS network allows a flexible point-to-point connection which can be changed on an order of milliseconds time scale. Since future bandwidths of processors will increase, the use of OCS architecture could support future higher bandwidth needs and protocols with the same switching network. The OCS network does not need to change circuit connections very quickly as with routing through a packet switching network. Adjustments to circuit connections only need to be done when work locations are adjusted to load balance the work among nodes. The nature of computation performed by SPS is such that the communication patterns and durations of those are stable for quite a long time (e.g., minutes or hours), enough to amortize the relative high switching time of the OCS (milliseconds). Since adjustments to the placement of work for load balancing for the computation done within different processors is an operation that does not happen frequently (due to its own high cost of computation and complexity), this exemplary stream processing architecture uniquely matches between properties of the SPS needs to special features of the OCS interconnection technology without noticeable drawbacks in overall performance. In fact, using this network, once reconfigured, may result in better communication latency, as it has no queue congestions, no contentions and a transparency to protocol and data bandwidth.

Figure 2:
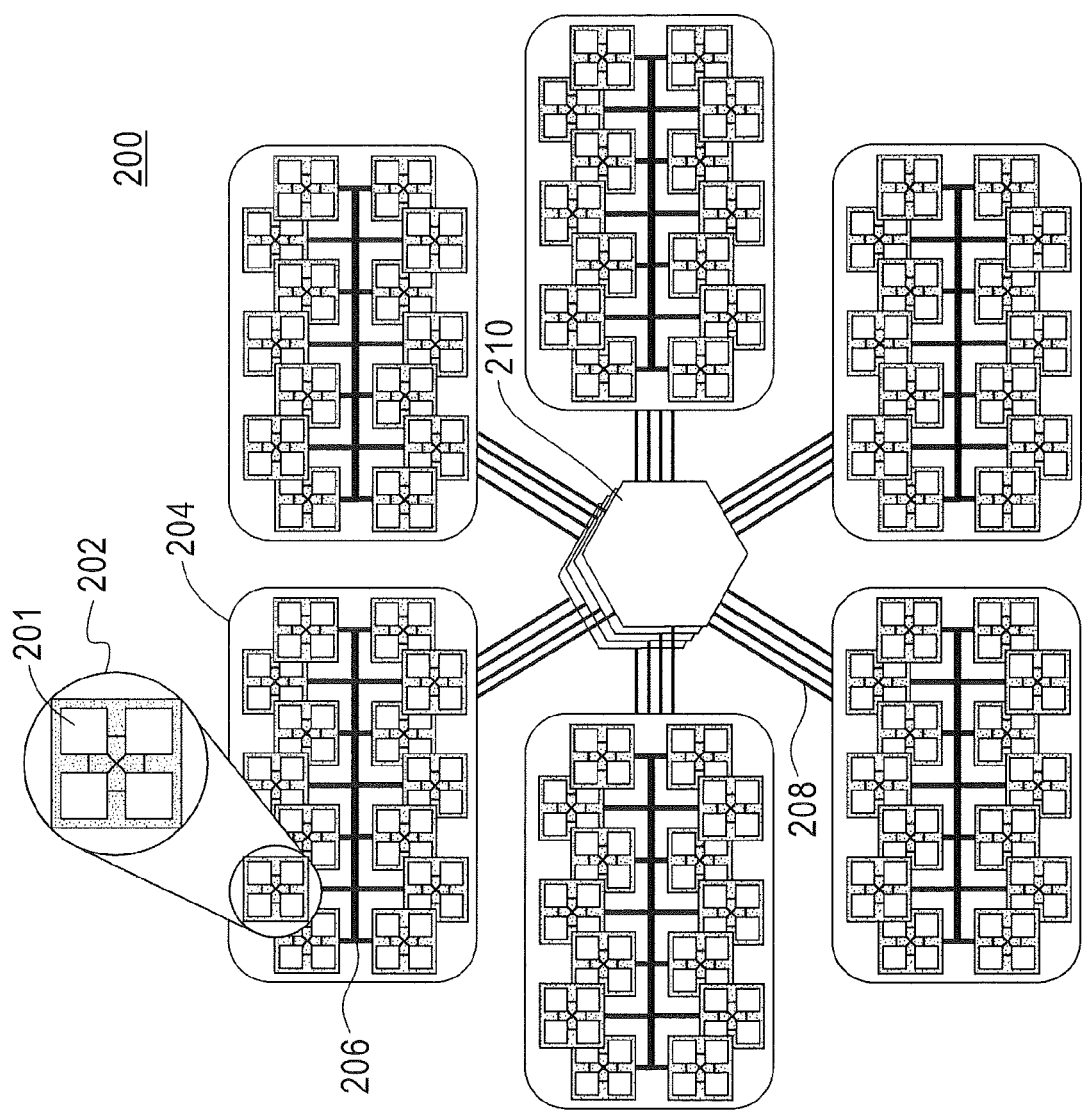
FIG. 2 is a diagram of a stream computer system in accordance with an exemplary embodiment of the invention.

Turning now to FIG. 2, a stream computer system 200 having the exemplary stream processing architecture will now be described in an exemplary embodiment. The stream computer system 200 is made up of individual physical computation nodes 201 connected together to form a multiprocessor 202. A number of these processors 202 are grouped together to form a super node cluster 204 (also referred to herein as 'super node' and 'cluster'). The processors (and respective physical computation nodes) inside a cluster 204 are connected locally by a known fast interconnection means 206, which could be a direct connected network with some topology between the processors' 202 physical computation nodes within a cluster, or a switch, through memory via a cache coherent symmetric multiprocessor (SMP) fabric, or a combination of the above. Each cluster 204 of processors 202 shares a number of optical external links 208. These external links are made for optimizing a point-to-point connection at very high bandwidth. This optimization, may be in the physical implementation used, in the protocol chosen to facilitate such high bandwidth, in a low latency cluster-to-cluster link, and has the ability to support aggregation of multiple streams within one physical link or multiple physical links to look like one high bandwidth physical link made of a few physical links. Since these external links are circuit switched, via an all optical switch that will not be aware to the protocol, data or content of such, these should use a very light weight communication protocol. Furthermore, the physical properties of these external links may require the use of multiple optical wavelengths in a WDM (wavelength division multiplexer), which are all coupled into one fiber or one external link, but are separable at both ends. The mirror-based MEMS OCS will deflect in the optics domain, the light beams within these external links, regardless of their number of wavelength, protocol, and signaling speed. These external links are common to all computation nodes within a cluster, such that any physical computation node 201 in the cluster 204 can pass information on one or all of these external links 208, either directly or by passing through the locally interconnected cluster fabric 206. In one exemplary embodiment, circuit switching switches 210 are used. Circuit switching switches 210 do not need to switch frequently, and thus may be much simpler to build, and can use different technologies (e.g., all optical, MEMS mirror based) to dynamically connect between multiple clusters 204. The specific connection at any given time between these clusters 204 is optimized based on a given stream computation graph the computation of which is performed by the physical computation nodes 201 and clusters 204 being connected.

These types of external links 208 and dynamic switching enable very high throughput (high bandwidth) connectivity that dynamically changes as needed. As multi-core processing chips require very high bandwidth networks to interconnect them to other such physical processing nodes or memory subsystem, the exemplary stream processing architecture plays a vital role in providing such a mechanism that specifically is functionally enabled by stream processing computation graphs and their relatively fixed nature. This provides more efficient routing, as packets do not need to be reexamined and route on a packet per packet basis. The construction of the circuit switches 210 may be optimized to such function and, with appropriate technology (e.g., all optical circuit switching), can manipulate large amounts of information (streams) efficiently, with very low power and cost effectively.

It is also important to note that the diagram shown in FIG. 2 depicts only the main conduit of data in the system. It will be understood that another slower network (not shown), that offers complete connectivity between all clusters/computation nodes in the system is also provided for use in handling less busy connections, as well as for control and other lower bandwidth communications. Thus, a packet-switched network, for example, may be used to transfer those data streams (e.g., 104) that are determined to transmit minimal data. The determination may be made by specifying a threshold function (e.g., a quantified number of data passing within a predefined time period, or a function of priority for the particular computation or other such systems and operational related parameters), whereupon once the threshold is reached, the streams are routed through the circuit switched based network. Hence, the routing of streams may start all as assigned to pass through the packet switching network, while as the computation progresses and more bandwidth is transferred within a stream, such will be redirected to pass through the external links forming the circuit switching network.

Figure 3:
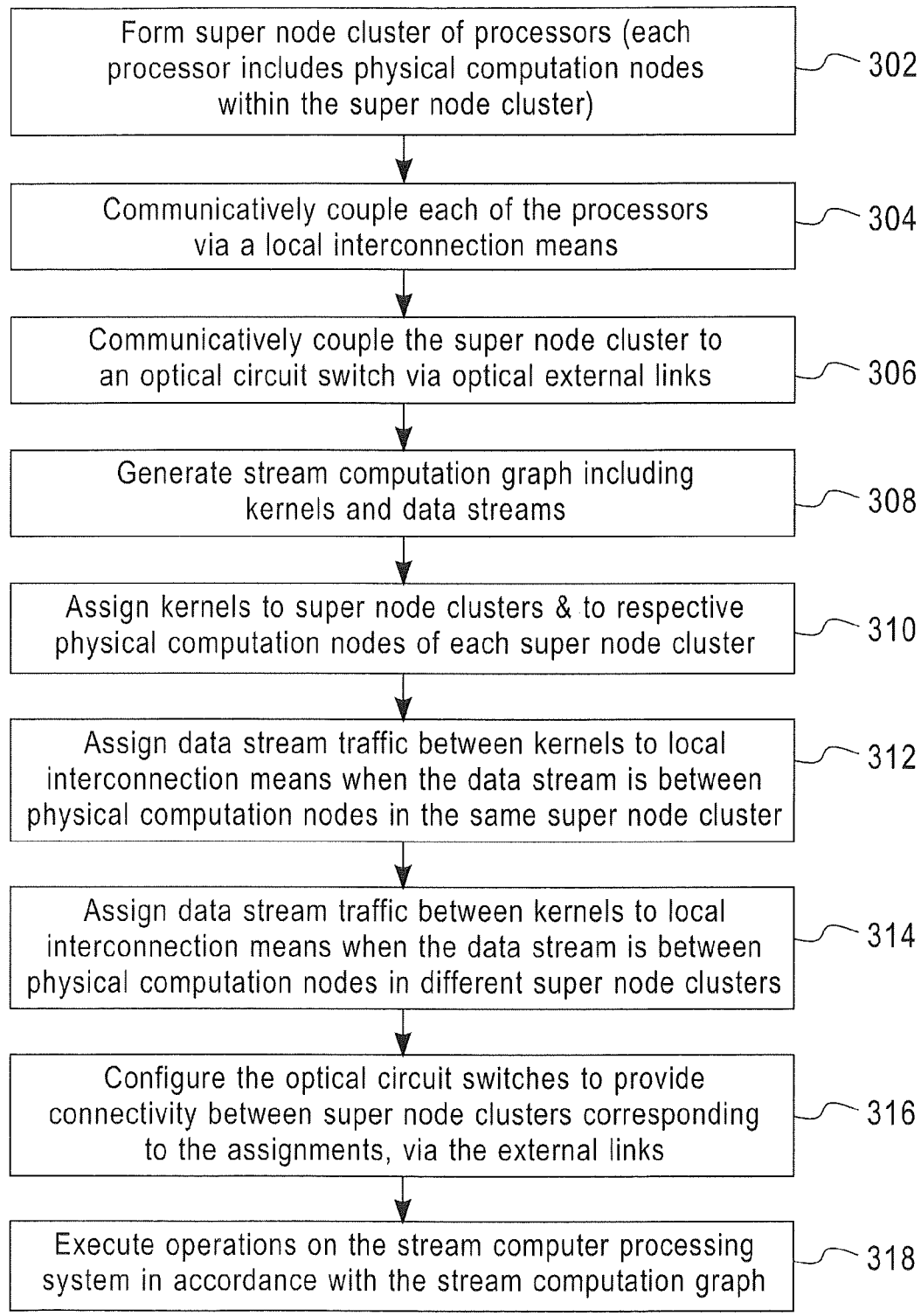
FIG. 3 is a flow diagram describing a process for creating and managing a stream processing architecture of the stream computer system in an exemplary embodiment of the invention.

Turning now to FIG. 3, a flow diagram describing a process for implementing the stream processing architecture will now be described in an exemplary embodiment. In the flow diagram of FIG. 3, steps 302-306 are directed to creating an exemplary stream computer processing system. Step 308 is directed to generating an exemplary stream computation graph, steps 310-316 are directed to mapping the stream computation graph to the stream computer processing system, and step 318 is directed to executing the stream computation graph with respect to the stream computer processing system.

The creation of the stream computer processing system will now be described. At step 302, a super node cluster of processors (e.g., processors 202 of FIG. 2) is formed. At step 304, each of the processors in the super node cluster is communicatively coupled via a local known interconnection means (e.g., network 206 of FIG. 2). The local known interconnection means may be implemented using, e.g., direct connection, through memory via a cache coherent symmetric multiprocessor (SMP) fabric, a switch, or a combination thereof.

At step 306, the super node cluster (e.g., cluster 204 of FIG. 2) is communicatively coupled to one or more optical circuit switches (e.g., switches 210 of FIG. 2) via one or more optical external links (e.g., links 208). The optical circuit switch is communicatively coupled to the other super node clusters of processors that include other physical computation nodes via the optical external links from the super node cluster to the optical circuit switch.

Figure 4:
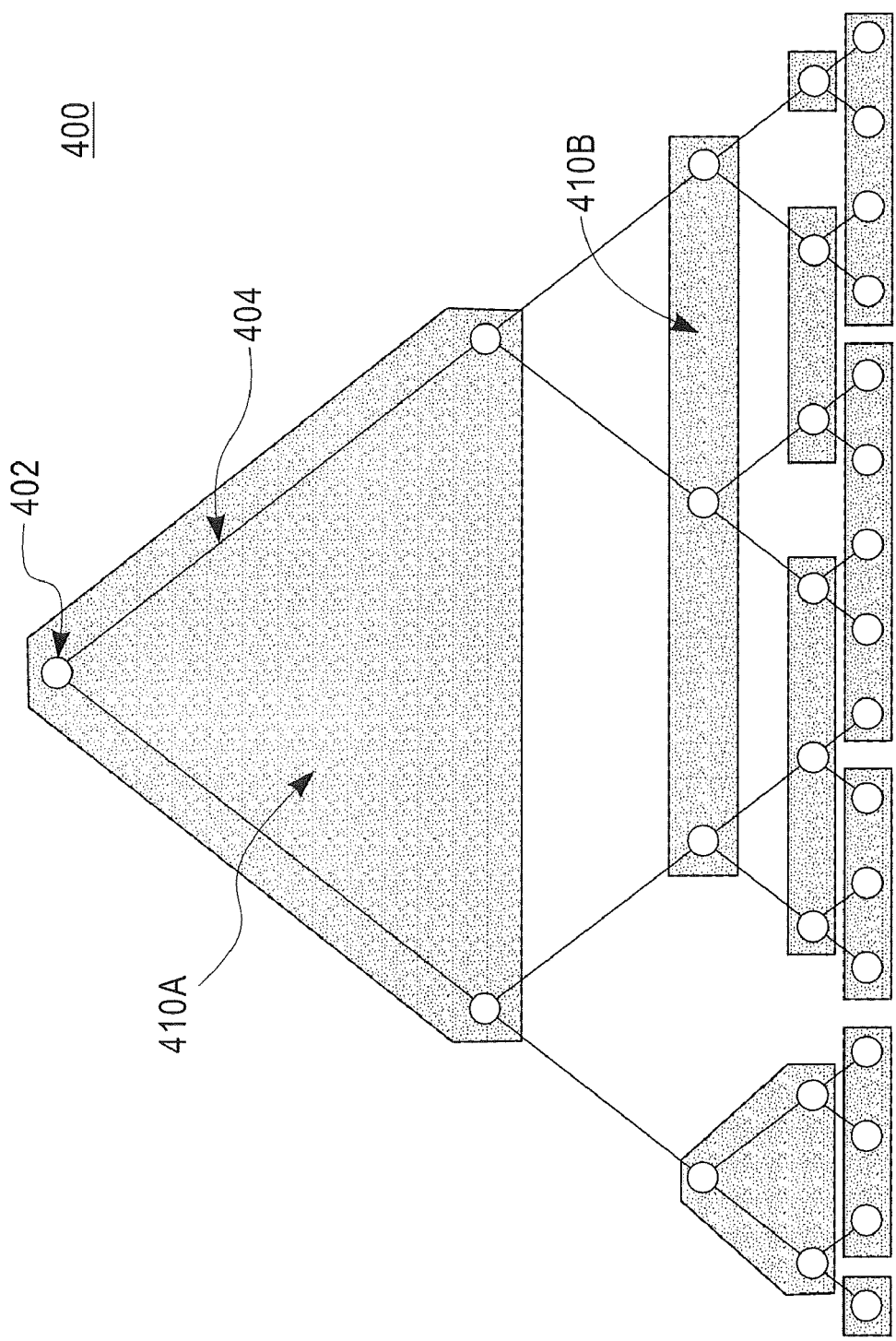
FIG. 4 illustrates a stream computation graph including a binary tree topology, as an example of a computation graph, which illustrates how its kernels are grouped into super nodes, as well as how these super nodes are interconnected in an exemplary embodiment.

As indicated above, a stream computation graph is generated at step 308 for the stream computation system created in steps 302-306. The stream computation graph includes kernels and data streams. The kernels represent software code elements that perform computations on one or more of the data streams that are input to corresponding kernels. FIG. 4 shows a stream computation graph 400 with a binary tree topology. Kernels 402 send streams of data 404 to other kernels. These kernels 402 are grouped into super nodes, such as super nodes 410A and 410B having certain desirable properties.

Figure 5A:
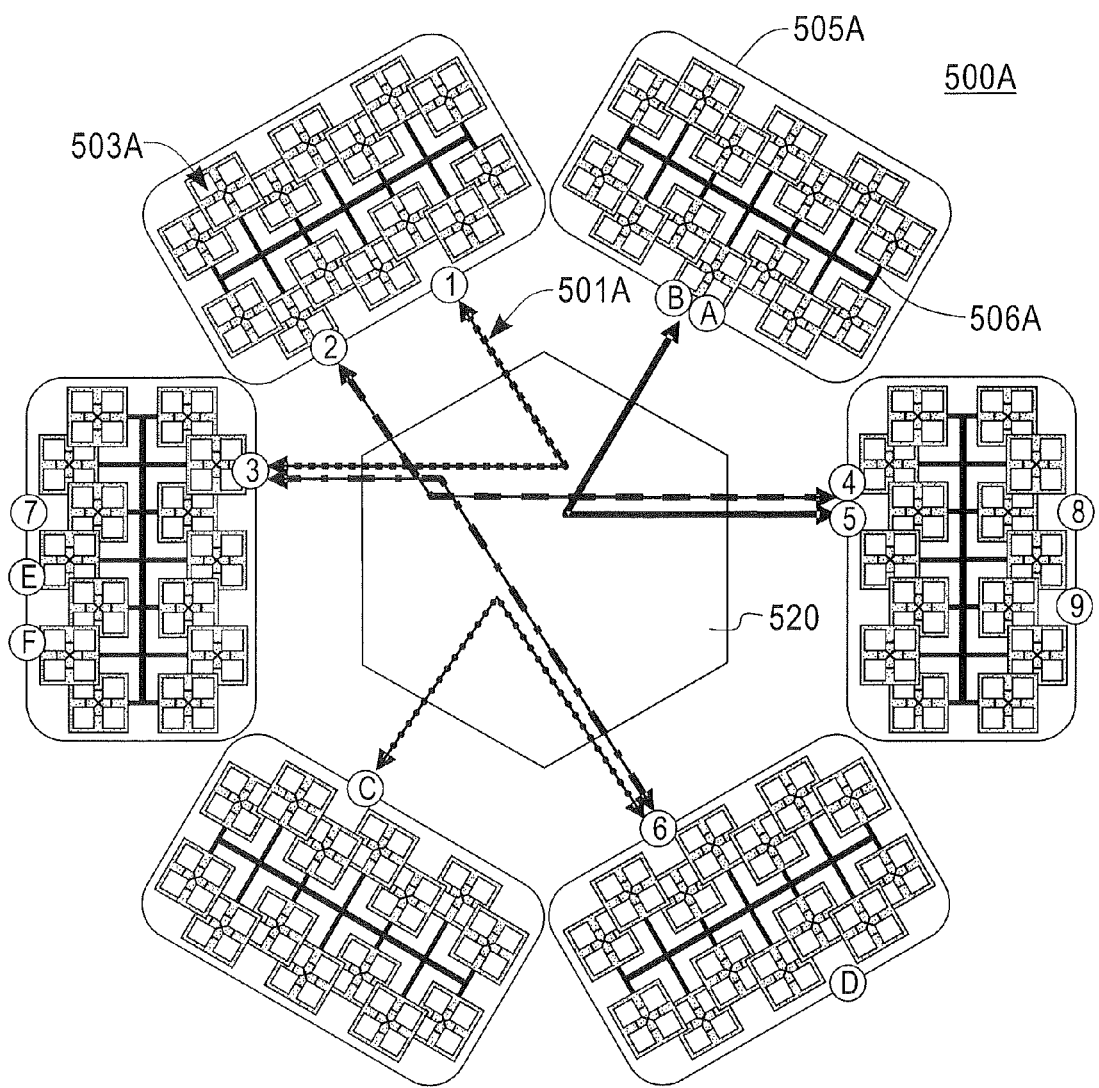
FIG. 5A illustrates an exemplary stream computer system to which an exemplary stream computation graph, which is shown in FIG. 5B, is mapped or embedded onto.
Figure 5B:
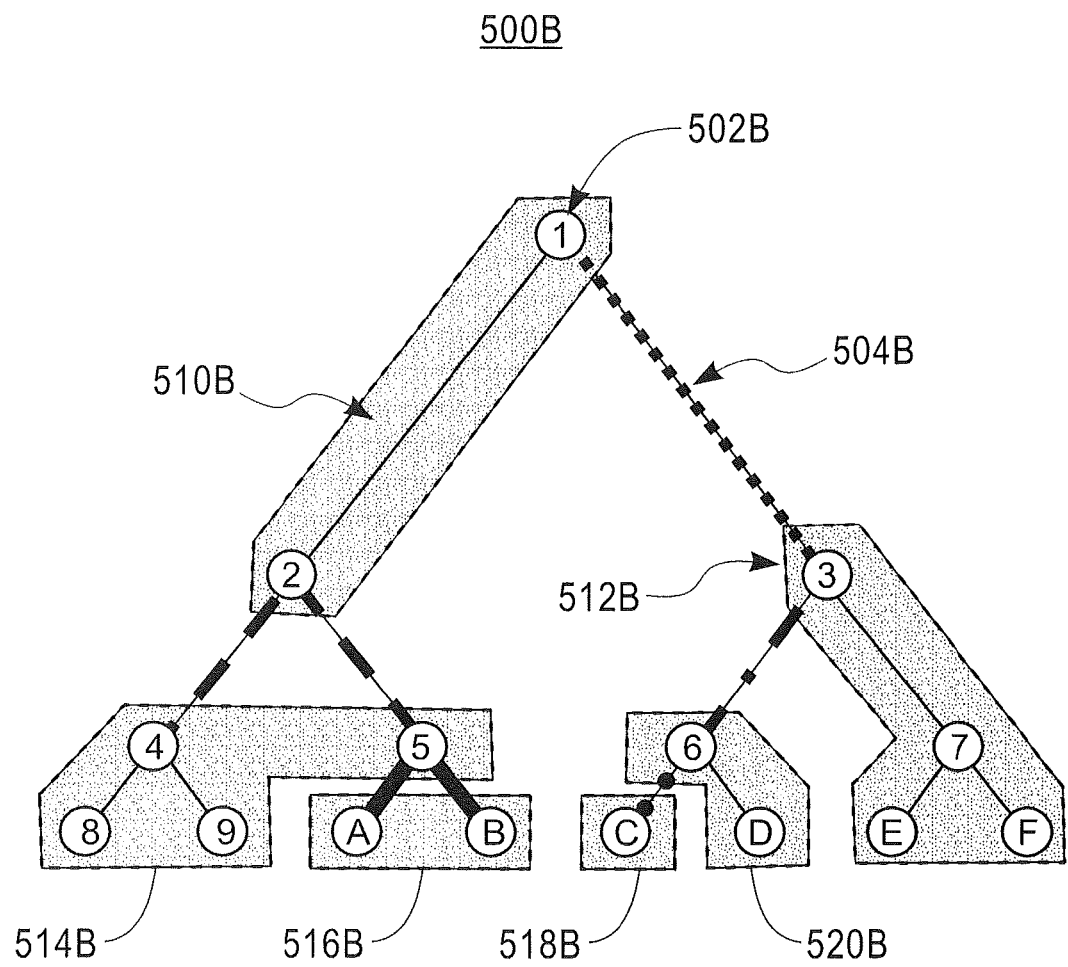

As indicated above, the stream computation graph is mapped to the stream computer processing system as will now be described. Turning now to FIGS. 5A and 5B, the kernels and the data streams of a stream computation graph (e.g., stream computation graph 500B) are mapped onto reconfigurable circuit switched connected clusters (e.g., clusters 505A of stream computer system 500A). At step 310, the kernels are assigned to super node clusters and to respective physical computation nodes of each of the super node clusters. As shown in FIG. 5B, a kernel, such as kernel 502B has been assigned onto a physical computation node (e.g., node 503A) on the system 500A of FIG. 5A. The grouping of nodes shown in FIG. 5B forming super nodes (e.g., super nodes 510B and 512B, and connected with a data stream (shown as stream 504B) has been respectively mapped onto the structure shown in FIG. 5A (see connection 501A).

At step 312, data stream traffic between the kernels is assigned to the local known interconnection means when the data stream is between physical computation nodes in the same super node cluster.

At step 314, data stream traffic between the kernels is assigned to the optical external links when the data stream is between physical computation nodes in different super node clusters.

At step 316, the optical circuit switches are configured to provide connectivity between super node clusters corresponding to the assignments, via the external links (as shown in FIGS. 5A and 5B, the circuit switches 520 have been reconfigured to provide the needed connectivity between these mapped super nodes (e.g., super nodes 510B, 512B, 514B, 516B, 518B, 520B). The set up of connections between clusters, i.e., the use of the external links each cluster will have connected, via the OCS switch, to specific other clusters, is based on an optimization process of mapping kernels onto physical processing nodes. At the end of this process, the total amount of reserved communication that goes, as a whole, between clusters (based on a summary of all streams edges in the original graph) is being calculated, resulting in the total bandwidth required for communication, between each cluster and all other clusters. Then, appropriate external links are configured through the OCS switch to support such bandwidth between any cluster to all others. Lower bandwidth threshold connections, are routed through the packet switching network (i.e., those which do not merit the establishment of a circuit, through the OCS, using the high bandwidth external links, because of very low anticipated data passing through these connections).

At step 318, the operations on the stream computer processing system are executed according to the stream computation graph, such that specific connections at a given time between the clusters are optimized.

Thus, above process results in satisfying the topology of the stream computation graph (shown in FIG. 4 as a binary tree, as an example of one possible such graph) and dynamically changing the circuit switches 520 to match the needed communication pattern among clusters 505A, while the local separation of individual streams of data is done locally by the cluster interconnects 506A (as shown in FIGS. 5A and 5B).

As can be seen from the exemplary embodiments described above, the combination of optical communication and the stream processing paradigm addresses the aforementioned programming and bandwidth challenges. Optical communication links provide ultra-high throughput, minimal communication latencies, and low operation power that remains independent of capacity. An optical circuit switching interconnection network that can capitalize on the capacity, transparency, and fundamentally low power consumption of optical links, combined with high-radix MEMS (Micro Electro Mechanical Systems) switches, can deliver bandwidth-per-watt that is simply not possible with all-electronic interconnects. Further, an ultra-high-bandwidth OCS interconnection network is an optimal solution for a SPS whose computational performance depends directly on maximizing the I/O data bandwidth of the streams that are currently processed and on minimizing the latency of large DMA transfers of the streams that will be processed next. Additionally, an SPS typically sets up connections among the processors that are relatively long lived, so the longer switching time of OCS is not a concern.

Optical communication further addresses the programmability challenge for SPSs because it minimizes the access time to large data sets in a given memory from any given processing node regardless of their relative positions. Reducing time variations in data access helps to simplify the modeling of the stream processing system. In turn, a simplified abstract system-level model facilitates the solution of the problem of deriving a balanced deployment of a large-scale streaming application onto the SPS architecture to maximize its sustained processing throughput. Such a model can further enable the development of automatic optimization methods for both the static orchestration of data transfers and data processing across the entire SPS at compile time and the dynamic rebalancing of communication and computation during SPS operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing a stream processing computer architecture, comprising:

forming a super node cluster of processors, each of the processors comprising at least one physical computation node within the super node cluster of processors, the super node cluster of processors formed by identifying relationships among processors with respect to associated data streams paths;

communicatively coupling each of the processors in the super node cluster of processors via a local interconnection means; and communicatively coupling the super node cluster of processors to at least one optical circuit switch, via one or multiple optical external links, the optical external links each using multiple optical wavelengths in a wavelength division multiplexer, the optical circuit switch communicatively coupled to at least one other super node cluster of processors that respectively includes at least one other physical computation node, via one or more optical external links from the other super node cluster of processors;

generating a stream computation graph including kernels and data streams, the kernels representing software code elements that perform computations on one or more of the data streams that are input to corresponding kernels and travel via the data stream paths;

mapping components of the stream computation graph to physical components of the stream computer processing system, the mapping comprising:

assigning the kernels to the super node cluster of processors and to respective physical computation nodes of each of the super node cluster of processors;

assigning data stream traffic between the kernels to the local interconnection means when the respective data stream is between physical computation nodes in the same super node cluster of processors;

assigning data stream traffic between the kernels to the optical external links when the respective data stream is between physical computation nodes in different super node cluster of processors; and configuring the optical circuit switch to provide connectivity between the super node cluster of processors corresponding to the assignments, via the optical external links; and executing stream processing operations on the stream computer processing system in accordance with the stream computation graph.

2. The method of claim 1, wherein configuring the optical circuit switch includes dynamically switching the connectivity of the optical circuit switch to reflect changes made to the stream computation graph.

3. The method of claim 2, wherein changes to the stream computation graph reflect load balancing activities.

4. The method of claim 1, wherein individual data streams within a super node cluster of processors are managed by a corresponding local interconnection means of the super node cluster of processors.

5. The method of claim 4, wherein the local interconnection means is implemented by at least one of:
   direct connection;
   through memory via a cache coherent symmetric multiprocessor (SMP) fabric; and
   a switch.

6. The method of claim 1, wherein the physical computation node is a single processor.

7. The method of claim 1, wherein the physical computation node is a multi-processor.

8. The method of claim 1, wherein the stream computation graph is generated using a binary tree topology.

9. The method of claim 1, further comprising using a packet-switched network to transfer those of the data streams between kernels that are determined to encounter minimal data passing, the determination made using a threshold function.

10. A system for implementing a stream processing computer architecture, comprising:
   a stream computer processing system comprising:
      a super node cluster of processors, each of the processors comprising at least one physical computation node within the super node cluster, the super node cluster of processors formed by identifying relationships among processors with respect to associated data streams paths;
      wherein each of the processors in the super node cluster of processors is communicatively coupled to one another via a local interconnection means; and
   wherein the super node cluster of processors is communicatively coupled to at least one optical circuit switch, via one or multiple optical external links, the optical external links each using multiple optical wavelengths in a wavelength division multiplexer, the optical circuit switch communicatively coupled to at least one other super node cluster of processors that respectively includes at least one other physical computation node, via one or more optical external links from the other super node cluster of processors;
   a stream computation graph including kernels and data streams, the kernels representing software code elements that perform computations on one or more of the data streams that are input to corresponding kernels and travel via the data stream paths;
   wherein the stream computation graph is mapped to the stream computer processing system, the mapping comprising:
      assigning the kernels to the super node cluster of processors and to respective physical computation nodes of each of the super node cluster of processors;
      assigning data stream traffic between the kernels to the local interconnection means when the respective data stream is between physical computation nodes in the same super node cluster of processors;
      assigning data stream traffic between the kernels to the optical external links when the respective data stream is between physical computation nodes in different super node cluster of processors; and
      configuring the optical circuit switch to provide connectivity between super node cluster of processors corresponding to the assignments, via the optical external links;
   wherein stream processing operations on the stream computer processing system are executed in accordance with the stream computation graph.

11. The system of claim 10, wherein configuring the optical circuit switch includes dynamically switching the connectivity of the optical circuit switch to reflect changes made to the stream computation graph.

12. The system of claim 11, wherein changes to the stream computation graph reflect load balancing activities.

13. The system of claim 10, wherein individual data streams within a super node cluster of processor are managed by a corresponding local interconnection means of the super node cluster of processors.

14. The system of claim 13, wherein the local interconnection means is implemented by at least one of:
   direct connection;
   through memory via a cache coherent symmetric multiprocessor (SMP) fabric; and
   a switch.

15. The system of claim 10, wherein the physical computation node is a single processor.

16. The system of claim 10, wherein the physical computation node is a multi-processor.

17. The system of claim 10, wherein the stream computation graph is generated using a binary tree topology.

18. The system of claim 10, further comprising a packet-switched network, the packet-switched network transferring those of the data streams between kernels that are determined to encounter minimal data passing, the determination made using a threshold function.

* * * * *